US012632245B2

(12) United States Patent
Han

(10) Patent No.: US 12,632,245 B2
(45) Date of Patent: May 19, 2026

(54) FIRMWARE UPGRADING METHOD AND APPARATUS, BMC, SERVER AND MEDIUM

(71) Applicant: Suzhou MetaBrain Intelligent Technology Co., Ltd., Suzhou (CN)

(72) Inventor: Lei Han, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/115,811

(22) PCT Filed: Jan. 8, 2024

(86) PCT No.: PCT/CN2024/071061
§ 371 (c)(1),
(2) Date: Mar. 27, 2025

(87) PCT Pub. No.: WO2024/255223
PCT Pub. Date: Dec. 19, 2024

(65) Prior Publication Data
US 2026/0104884 A1 Apr. 16, 2026

(30) Foreign Application Priority Data

Jun. 13, 2023 (CN) .......................... 202310694567.2

(51) Int. Cl.
*G06F 9/44* (2018.01)
*G06F 8/65* (2018.01)
(Continued)

(52) U.S. Cl.
CPC ................ *G06F 8/65* (2013.01); *G06F 9/544* (2013.01); *G06F 13/24* (2013.01)

(58) Field of Classification Search
None
See application file for complete search history.

(56) References Cited

U.S. PATENT DOCUMENTS

| | | | |
|---|---|---|---|
| 5,764,931 A | 6/1998 | Schmahl et al. | |
| 2019/0026022 A1 | 1/2019 | Nelogal et al. | |

(Continued)

FOREIGN PATENT DOCUMENTS

| | | | | |
|---|---|---|---|---|
| CN | 1570907 A | 1/2005 | | |
| CN | 106528213 A | * 3/2017 | ............... | G06F 8/65 |

(Continued)

OTHER PUBLICATIONS

International Search Report of corresponding PCT application (PCT/CN2024/071061) mailed Apr. 18, 2024, 6 pages.

(Continued)

*Primary Examiner* — Insun Kang
(74) *Attorney, Agent, or Firm* — COOPER LEGAL GROUP LLC

(57) ABSTRACT

The present application discloses a firmware upgrading method and apparatus, a BMC, a server and a medium. The method includes: powering on a coprocessor, loading same with a coprocessor system, and initializing inter-core communication with a main processor; powering on the main processor and loading same with a main processor system, and releasing a bus control right by means of loading a bus driver; the main processor sending a bus control right release message to the coprocessor, in response to the bus control right release message, the coprocessor taking over the bus control right; the main processor sending new firmware and a firmware upgrading message to the coprocessor; and, in response to the firmware upgrading message, the coprocessor writing the new firmware into a corresponding server hardware component by means of a bus, so as to upgrade firmware of the server hardware component.

19 Claims, 8 Drawing Sheets

(51) Int. Cl.
   *G06F 9/54*         (2006.01)
   *G06F 13/24*       (2006.01)

(56)               References Cited

U.S. PATENT DOCUMENTS

| | | | |
|---|---|---|---|
| 2021/0240646 | A1 | 8/2021 | Robertson et al. |
| 2022/0129258 | A1* | 4/2022 | Ladkani .................. G06F 8/65 |

FOREIGN PATENT DOCUMENTS

| | | | | |
|---|---|---|---|---|
| CN | 107483569 | A | 12/2017 | |
| CN | 112799974 | A * | 5/2021 | ......... G06F 9/30098 |
| CN | 113703818 | A | 11/2021 | |
| CN | 114201197 | A | 3/2022 | |
| CN | 114995860 | A | 9/2022 | |
| CN | 115047954 | A | 9/2022 | |
| CN | 115185564 | A | 10/2022 | |
| CN | 115203142 | A | 10/2022 | |
| CN | 116431190 | A | 7/2023 | |

OTHER PUBLICATIONS

Written Opinion of International Searching Authority of corresponding PCT application (PCT/CN2024/071061) Apr. 1, 2024, 7 pages.
First Office Action of corresponding CN priority application (CN202310694567.2) mailed Jul. 24, 2023, 8 pages.
Notification to Grant Patent Right for Invention of corresponding CN priority application (CN202310694567.2), mailed Aug. 3, 2023, 3 pages.
European Search Report cited in EP24822184, mailed Jan. 29, 2026, 10 pages.

* cited by examiner

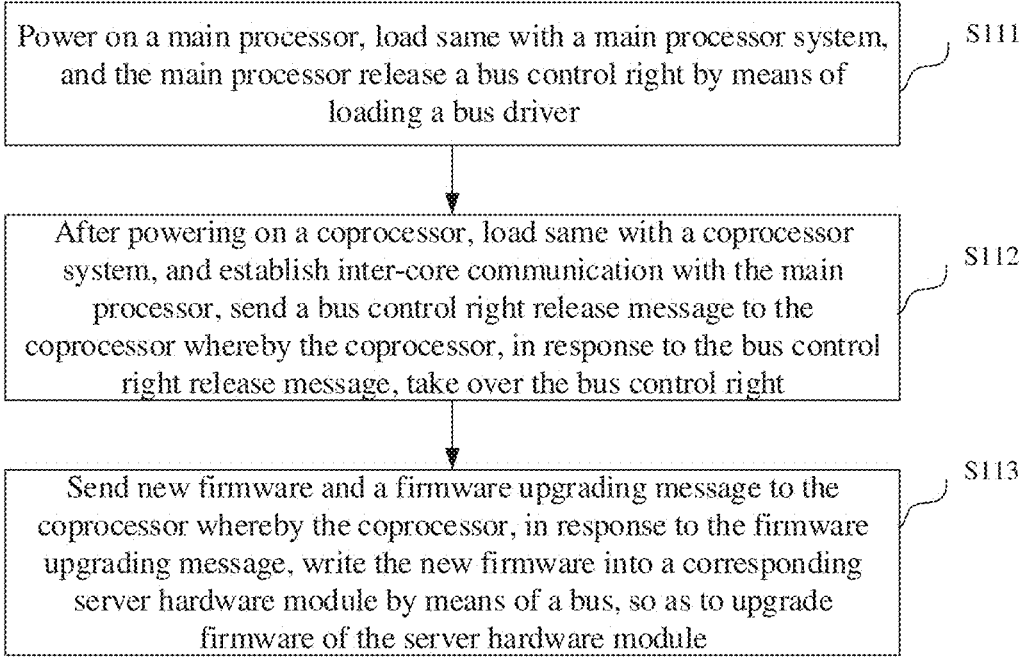

Power on a main processor, load same with a main processor system, and the main processor release a bus control right by means of loading a bus driver    S111

After powering on a coprocessor, load same with a coprocessor system, and establish inter-core communication with the main processor, send a bus control right release message to the coprocessor whereby the coprocessor, in response to the bus control right release message, take over the bus control right    S112

Send new firmware and a firmware upgrading message to the coprocessor whereby the coprocessor, in response to the firmware upgrading message, write the new firmware into a corresponding server hardware module by means of a bus, so as to upgrade firmware of the server hardware module    S113

FIG. 12

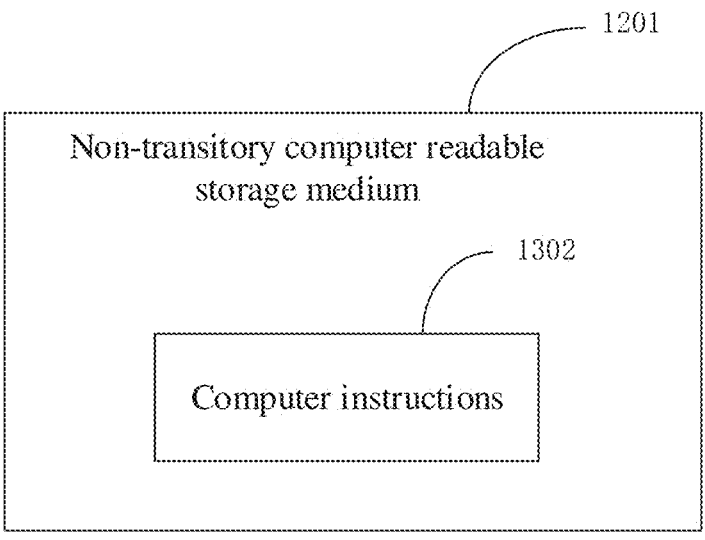

1201

Non-transitory computer readable storage medium

1302

Computer instructions

FIG. 13

FIRMWARE UPGRADING METHOD AND APPARATUS, BMC, SERVER AND MEDIUM

CROSS-REFERENCE TO RELATED APPLICATION

This application is the national phase application of International Application No. PCT/CN2024/071061, filed Jan. 8, 2024, which claims priority from Chinese Patent Application No. 202310694567.2, submitted to China National Intellectual Property Administration, filed on Jun. 13, 2023 and entitled "FIRMWARE UPGRADING METHOD AND APPARATUS, BMC, SERVER AND MEDIUM". The contents of International Application No. PCT/CN2024/071061 and Chinese Patent Application No. 202310694567.2 are incorporated herein by reference in their entireties.

FIELD

The present application relates to a firmware upgrading method and apparatus, a BMC, a server and a medium.

BACKGROUND

A baseboard management controller (BMC) is a controller for device information management, status monitoring, remote control and maintenance management on a server. With the continuous upgrading of the BMC, a new generation of BMC AST2600 is significantly improved in performance compared with the previous generation, which provides the possibility for a server motherboard achieving more functions. The AST2600 provides 3 advanced RISC machine (ARM) processors, a number of which is increased by 2 compared to that in the previous generation of product; and the ARM processors in some embodiments include 2 Cortex A7 main processors and 1 Cortex M3 coprocessor. At present, such multi-processor BMC upgrade related firmware of the server by means of the main processor (such as Cortex A7), and the coprocessor (such as Cortex M3) is idle. It is appreciated by the inventor that effective use of the coprocessor has always been a problem, making tasks of the main processor heavy and overall performance of the BMC poor.

SUMMARY

According to various embodiments disclosed by the present application, in a first aspect, provided is a firmware upgrading method, applied to a coprocessor, and including: powering on the coprocessor, loading same with a coprocessor system, and establishing inter-core communication with a main processor; receiving a bus control right release message sent by the main processor, the bus control right release message being a notification message sent by the main processor to release a bus control right by means of loading a bus driver after powering on the main processor and loading same with the main processor system; in response to the bus control right release message, taking over the bus control right; receiving new firmware and a firmware upgrading message sent by the main processor; and, in response to the firmware upgrading message, writing the new firmware into a corresponding server hardware component by means of a bus, so as to upgrade firmware of the server hardware component.

According to various embodiments disclosed by the present application, in a second aspect, provided is a firmware upgrading method, applied to a main processor, and including: powering on the main processor, loading same with a main processor system, and the main processor releasing a bus control right by means of loading a bus driver; after powering on a coprocessor, loading same with a coprocessor system, and establishing inter-core communication with the main processor, sending a bus control right release message to the coprocessor whereby the coprocessor, in response to the bus control right release message, takes over the bus control right; and sending new firmware and a firmware upgrading message to the coprocessor whereby the coprocessor, in response to the firmware upgrading message, writes the new firmware into a corresponding server hardware component by means of a bus, so as to upgrade firmware of the server hardware component.

According to various embodiments disclosed by the present application, in a third aspect, provided is a firmware upgrading method, including: powering on a coprocessor, loading same with a coprocessor system, and establishing inter-core communication with a main processor; powering on the main processor and loading same with a main processor system, and releasing a bus control right by means of loading a bus driver; after powering on the coprocessor, loading the same with the coprocessor system, and establishing inter-core communication with the main processor, the main processor sending a bus control right release message to the coprocessor; the coprocessor receiving the bus control right release message sent by the main processor; the coprocessor, in response to the bus control right release message, taking over the bus control right; the main processor sending new firmware and a firmware upgrading message to the coprocessor; the coprocessor receiving the new firmware and the firmware upgrading message sent by the main processor; and, in response to the firmware upgrading message, the coprocessor writing the new firmware into a corresponding server hardware component by means of a bus, so as to upgrade firmware of the server hardware component.

According to various embodiments disclosed by the present application, in a fourth aspect, provided is a firmware upgrading apparatus, applied to a coprocessor, and including: an initialization module, configured for powering on a coprocessor, loading same with a coprocessor system, and initializing inter-core communication with a main processor; a control right message receiving module, configured for receiving a bus control right release message sent by the main processor, the bus control right release message being a notification message sent by the main processor to release a bus control right by means of loading a bus driver after powering on the main processor and loading same with a main processor system; a control right taking over module, configured for, in response to the bus control right release message, taking over the bus control right; a firmware receiving module, configured for receiving new firmware and a firmware upgrading message sent by the main processor; and a firmware upgrading module, configured for, in response to the firmware upgrading message, writing the new firmware into a corresponding server hardware component by means of a bus, so as to upgrade firmware of the server hardware component.

According to various embodiments disclosed by the present application, in a fifth aspect, provided is a firmware upgrading apparatus, applied to a main processor, and including: a control right releasing module, configured for powering on the main processor, loading same with a main processor system, and the main processor releasing a bus control right by means of loading a bus driver; a control right message sending module, configured for, after powering on a coprocessor, loading same with a coprocessor system, and initializing inter-core communication with the main processor, sending a bus control right release message whereby the coprocessor, in response to the bus control right release message, takes over the bus control right; and a firmware sending module, configured for the main processor sending new firmware and a firmware upgrading message to the coprocessor whereby the coprocessor, in response to the firmware upgrading message, writes the new firmware into a corresponding server hardware component by means of a bus, so as to upgrade firmware of the server hardware component.

According to various embodiments disclosed by the present application, in a sixth aspect, provided is a BMC, including: a coprocessor, a main processor and a memory. The memory is communicatively connected with the coprocessor and the main processor respectively, and stores computer instructions therein. The coprocessor performs the method in the first aspect or any of its corresponding implementations by executing the computer instructions. The main processor performs the method in the second aspect or any of its corresponding implementations by executing the computer instructions.

According to various embodiments disclosed by the present application, in a seventh aspect, provided is a computer readable storage medium, storing computer instructions thereon. The computer instructions are configured for causing a computer to perform the method in the first aspect, the second aspect of any of their corresponding implementations.

According to various embodiments disclosed by the present application, in an eighth aspect, provided is a server, including a server motherboard and a BMC. The BMC is communicatively connected with each hardware component on the server motherboard, and stores computer instructions therein. The BMC is configured for performing the method in the first aspect, the second aspect or any of their corresponding implementations by executing the computer instructions.

BRIEF DESCRIPTION OF THE DRAWINGS

In order to describe the technical solutions in the specific implementations of the present application or in the prior art more clearly, the drawings that need to be used in the description of the specific implementations or the prior art are briefly introduced below. Apparently, the drawings in the description below show merely some implementations of the present application, and those of ordinary skill in the art may also acquire other drawings based on these drawings without any creative efforts.

FIG. 12 is a schematic flowchart of a firmware upgrading method applied to a main processor according to yet another or more embodiments of the present application; and FIG. 13 is a schematic structural diagram of a non-transitory computer readable storage medium according to one or more embodiments of the present application.

DETAILED DESCRIPTION

In order to make objectives, technical solutions, and advantages of embodiments of the present application clearer, the technical solutions in the embodiments of the present application are described clearly and completely in the following with reference to accompanying drawings in the embodiments of the present application. Apparently, the described embodiments are only part rather than all of the embodiments of the present application. On the basis of the embodiments in the present application, all other embodiments acquired by those skilled in the art without creative efforts fall within a protection scope of the present application.

A new generation of BMC AST2600 provides 3 ARM processors, a number of which is increased by 2 compared to that in the previous generation of product; and the ARM processors in some embodiments include 2 Cortex A7 main processors and 1 Cortex M3 coprocessor. In the future, a BMC with a multi-processor core should gradually become the mainstream. At present, such multi-processor BMCs upgrade related firmware of the server by means of the main processors, and the coprocessor is idle. Taking use of AST2600 as an example, the linux operating system is deployed in the main processor Cortex A7; no operating system is deployed in the coprocessor Cortex M3; and Cortex M3 only performs some simple computing works for assisting the main processor Cortex A7. If there is a need for upgrading firmware of some hardware components of the server, Cortex A7, in response to a received firmware upgrading request, writes received new firmware into a corresponding server hardware component by means of a bus, so as to upgrade the server hardware component. Therefore, effective use of the coprocessor has always been a problem whereby resources of the coprocessor have not been fully utilized. The vast majority of tasks are executed by the main processor, and small tasks such as firmware upgrade are no exception, which tasks of the main processor heavy, and overall performance of the BMC poor. In order to improve the overall performance of the BMC, the present application provides the following solution.

According to the embodiments of the present application, provided is a firmware upgrading method embodiment. It is to be noted that the steps shown in the flowcharts of the accompanying drawings may be executed in a computer system as a set of computer executable instructions. While a logical order is shown in flowcharts, the steps shown or described might, in some circumstances, be executed in a different order than presented herein.

Figure 1:
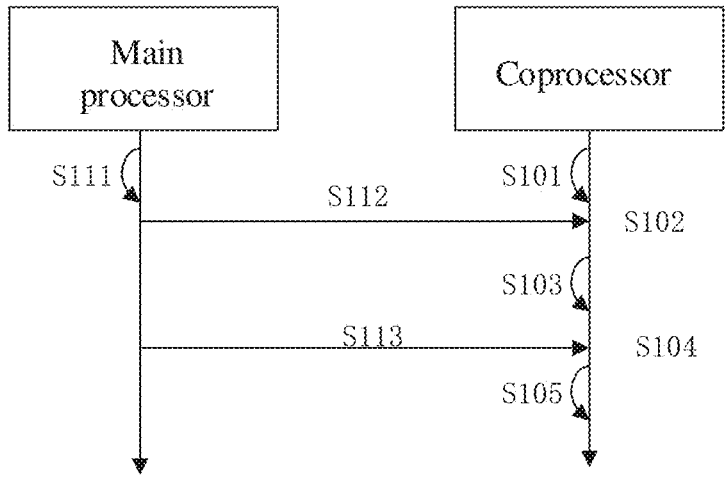
FIG. 1 is a first interaction schematic flowchart of a firmware upgrading method according to one or more embodiments of the present application.
Figure 11:
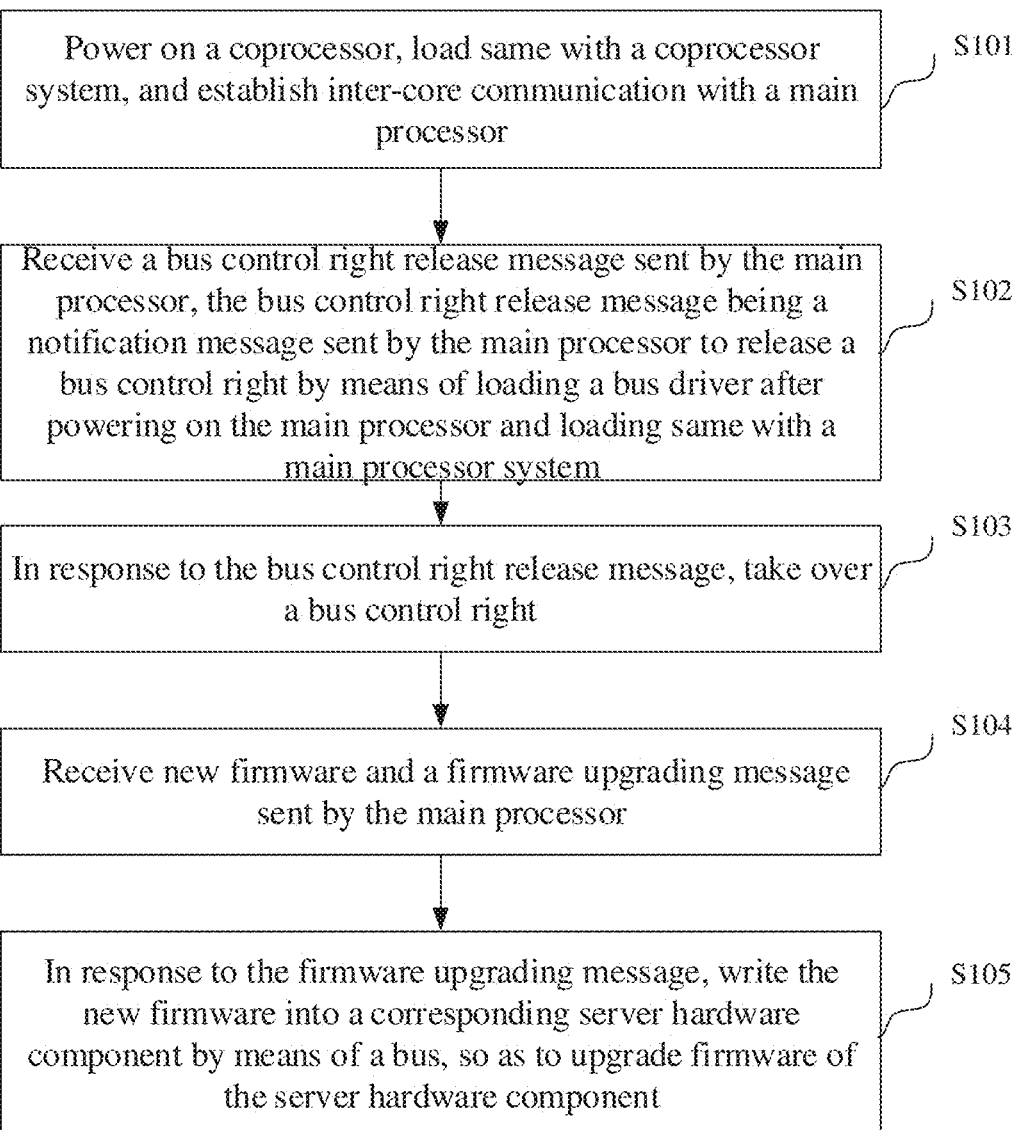
FIG. 11 is a schematic flowchart of a firmware upgrading method applied to a coprocessor according to one or more embodiments of the present application.

In the embodiment, provided is a firmware upgrading method which might be applied to the above BMC. FIG. 1 is a flowchart of a firmware upgrading method according to an embodiment of the present application. As shown in FIG. 1, FIG. 11 and FIG. 12, steps S101-S105 are applied to a coprocessor, and steps S111-S113 are applied to a main processor. This flow in some embodiments includes the following steps:

step S101, powering on the coprocessor, loading same with a coprocessor system, and establishing inter-core communication with a main processor;

step S111, powering on the main processor, loading same with a main processor system, and the main processor releasing a bus control right by means of loading a bus driver;

step S112, after powering on the coprocessor, loading same with the coprocessor system, and establishing inter-core communication with the main processor, sending a bus control right release message to the coprocessor;

step S102, receiving the bus control right release message sent by the main processor;

step S103, in response to the bus control right release message, taking over a bus control right;

step S113, sending new firmware and a firmware upgrading message to the coprocessor;

step S104, receiving the new firmware and the firmware upgrading message sent by the main processor; and step S105, in response to the firmware upgrading message, writing the new firmware into a corresponding server hardware component by means of a bus, so as to upgrade firmware of the server hardware component.

In some embodiments, in order to increase a utilization rate of the BMC to implement a coprocessor-based firmware upgrading solution, in the embodiment, a coprocessor operating system is pre-deployed in the coprocessor. A system kernel of the coprocessor operating system is not in some embodiments limited, including, but not limited to, the Windows kernel, the linux kernel, the ios kernel, etc. In one specific embodiment, the embodiment of the present application adopts a real time operating system (RTOS), which is an operating system that might accept and process external events or data quickly enough when the external events or the data are generated. Processing results might also control a production process or respond quickly to the processing system within a specified time, schedule all available resources to complete real-time tasks, and control coordinated operation of all the real-time tasks. Benefited from the advantages of no charge, a light weight and a low power consumption of the real-time operating system, the real-time operating system more adapt to the poor performance of the coprocessor, which makes the RTOS run more smoothly on the coprocessor, and provides a more reliable solution for the effective use of coprocessors such as Cortex M3. In addition, benefited from the advantages of a small size and fast startup of the real-time operating system, the operating system of the coprocessor is powered up earlier than the operating system of the main processor. Subsequent steps might make the coprocessor preferentially initialize inter-core communication, and, after inter-core communication initialization, make the main processor exactly execute a task of switching the bus control right, which improves cooperatively working efficiency of the main processor and the coprocessor.

After the coprocessor is powered on to start the system, the coprocessor actively is allowed to initialize inter-core communication with the main processor, to enable the main processor and the coprocessor to perform data interaction. The means of initializing inter-core communication might directly create a communication channel between the main processor and the coprocessor based on Mailbox, similar to that both the main processor and the coprocessor have a mailbox for receiving messages, and both sides send messages to each other to achieve communication; and in addition, the main processor and the coprocessor might also complete big data communication in a shared memory manner by means of a predefined protocol. After the main processor is powered on to start the system, the bus control right is released by the main processor by means of the bus driver pre-installed in the main processor system. The bus includes, but is not limited to, an I$^2$C bus, an SCI bus and an SPI bus. In one or more embodiments, if the BMC is AST2600, the bus refers to the I$^2$C bus. However, with the development of the BMC technology, the new multi-core BMC in the future might also communicate with the server hardware component by means of other types of buses whereby other types of buses should also fall into the protection scope of the present application. The present application does not make special limitations on specific bus types. After that, the main processor sends the bus control right release message to the coprocessor by means of an inter-core communication mechanism between the coprocessor and the main processor whereby the coprocessor knows that the main processor has not communicated with the server hardware component to take over the bus control right in time, and then the coprocessor communicates with the server hardware component. Then, in a case that the main processor receives a firmware upgrading task, the main processor might send the received new firmware to the coprocessor whereby the coprocessor that takes over the bus control right executes firmware upgrade, which provides a new direction for the coprocessor to share a main core task. Completing the firmware upgrading task with a dual system architecture shares the tasks of the main processor, reduces an overhead of the main processor, and improves the overall performance of the BMC.

In some optional implementations, if the bus is the I$^2$C bus, step S103 includes:

step a1, enabling the I$^2$C bus of the server hardware component by means of configuring a system control unit register; and step a2, acquiring a control right of the I$^2$C bus of the server hardware component by configuring an I$^2$C bus related register of the server hardware component.

In some embodiments, in one or more embodiments, the I$^2$C bus is used to control the server hardware component. Based on this, the embodiment allows the main processor to directly disable one way of I$^2$C bus of the server hardware component after startup, thereby releasing a control right of this bus. The coprocessor needs to reconfigure the I$^2$C bus to access the server hardware component by means of the I$^2$C bus. Before configuration, a pin of the server hardware component is a simple input and output interface. The interface might multiplex a variety of functions. At first, the interface is configured for inputting and outputting some general level signals, and does not have a communication function of the I$^2$C bus. Therefore, multiplexing configuration of a function of the I²C bus is completed by means of a system control unit (SCU) register on the BMC side whereby the pin of the server hardware component is set to have the I²C function by means of the register configuration. After successful setting, the I²C register is configured, such as a communication frequency of the bus and a communication address, thereby debugging the I²C bus. After successful configuration, data interaction between the coprocessor and the server hardware component by means of the I²C bus might be achieved, which in turn switches the I²C bus control right between the main processor and the coprocessor.

In some optional implementations, step S101 includes:

step a1, configuring a shared memory and an interrupt signal format, wherein the shared memory is configured for the main processor and the coprocessor reading and writing data together, and the interrupt signal format is configured for the main processor and the coprocessor sending interrupt signals of a corresponding format to each other to inform the other party to read the data from the shared memory; and step a2, setting an interrupt enable to start an interrupt.

In some embodiments, the present application allows the coprocessor to initialize inter-core communication by means of an interface protocol. The coprocessor needs to configure the interrupt signal format, which is configured the same in the coprocessor system and the main processor system. For example, assuming that XXXX1 signal represents a task of releasing the bus control right, and XXXX2 signal represents a task of firmware transmission. The coprocessor also partitions an independent storage space from the BMC's memory module as the shared memory. The shared memory is configured for the main processor and the coprocessor reading and writing the data together. By means of the shared memory, it is convenient for the firmware occupying a certain storage space to be stably transmitted between dual cores. Both the main processor and the coprocessor write data into the shared memory by using a preset inter-core communication driver function according to a specified data format by means of the interface protocol, and read data from the shared memory by using the preset inter-core communication driver function according to the specified data format. Compared with the method of completing communication between the dual cores by means of only a signal mechanism, as the system becomes more complex and an amount of codes is gradually increasing, non-protocol data communication brings great problems to programming and understanding, which reduces scalability of the system. In the embodiment of the present application, dual-core communication might adopt the same communication protocol as a system peripheral in initializing inter-core communication whereby the protocol might be reused to parse the inter-core communication driver function, and portability might also be improved at the same time. In addition, an applicable communication protocol might be defined autonomously as actually needed, or a general communication protocol might be modified appropriately to better adapt to mass data communication of the shared memory. A software encapsulation for the communication interface usually defines a data sending function, a data receiving function, a protocol parsing function, etc. The principle is that the interface should be simplified as much as possible, which reduces a coupling degree between the dual cores to the maximum, and then improves stability and reliability of firmware transmission.

Figure 2:
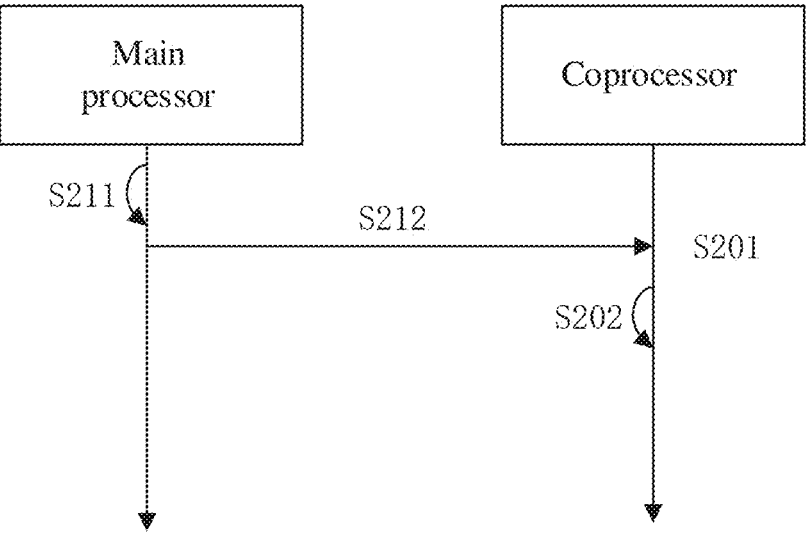
FIG. 2 is a second interaction schematic flowchart of a firmware upgrading method according to one or more embodiments of the present application.

In some optional implementations, as shown in FIG. 2, step S102 includes step S201 and step S202, and step S112 includes step S211 and step S212, in some embodiments as follows:

step S211, storing the bus control right release message in the shared memory by means of the preset inter-core communication driver function;

step S212, sending a first interrupt signal to the coprocessor;

step S201, receiving the first interrupt signal sent by the main processor; and step S202, in response to the first interrupt signal, reading the bus control right release message from the shared memory by means of the preset inter-core communication driver function.

In some embodiments, in the embodiment, the bus control right release message is transferred by means of an inter-core interrupt mechanism and the shared memory, thereby ensuring stable transmission of the bus control right release message. Meanwhile, the coprocessor is allowed to know in time that the main processor system has released the bus control right according to the received bus control right release message whereby the coprocessor might take over the bus control right at the first time, to communicate with the server hardware component by means of the bus, and control firmware of the server hardware component to upgrade, which increases the utilization rate of the coprocessor, and improves the overall performance of the BMC.

Figure 3:
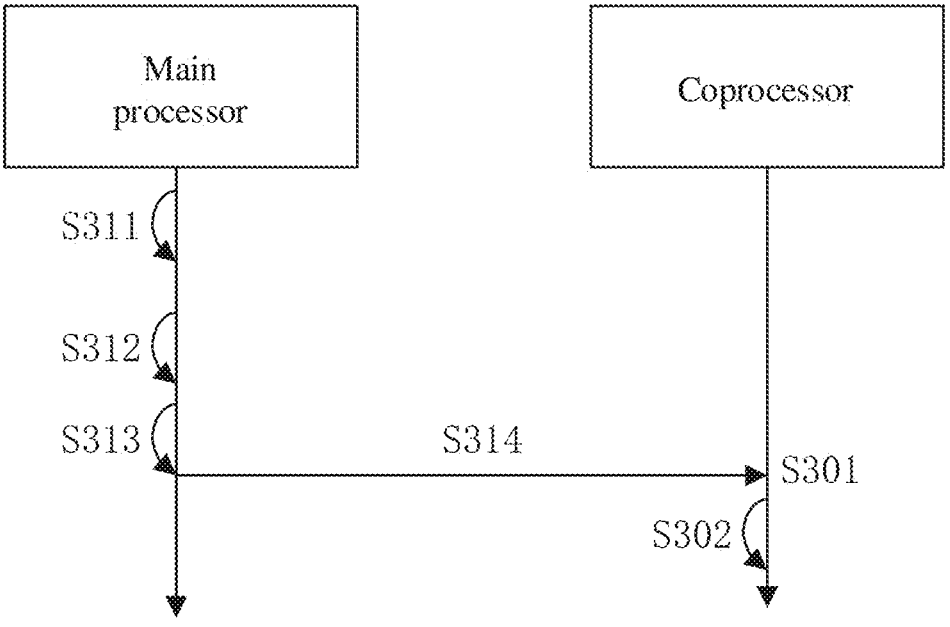
FIG. 3 is a third interaction schematic flowchart of a firmware upgrading method according to one or more embodiments of the present application.

In some optional implementations, as shown in FIG. 3, a front-end interface is deployed in the main processor system and is configured for a client remotely accessing the main processor system. The step S113 includes steps S311-S314, and the step S104 includes steps S301 and S302, in some embodiments as follows:

step S311, receiving new firmware uploaded by the client by means of the front-end interface;

step S312, checking the new firmware;

step S313, storing the firmware upgrading message and the checked new firmware in the shared memory by means of the inter-core communication driver function;

step S314, sending a second interrupt signal to the coprocessor;

step S301, receiving the second interrupt signal sent by the main processor; and step S302, in response to the second interrupt signal, reading the new firmware and the firmware upgrading message from the shared memory by means of the preset inter-core communication driver function.

In some embodiments, in the embodiment, a front-end interface is also deployed in the main processor system. A user might enter a predetermined web address in a browser through any computer device, log in to the front-end interface in a form of UI, select new firmware locally saved in the computer device by means of the front-end interface, and click Upload to remotely upload the new firmware to the main processor whereby the main processor receives a firmware upgrading task, which improves flexibility of firmware upgrade. After that, considering that the new firmware uploaded by the user through the computer device is often in a compressed packet format whereby the main processor also needs to check the new firmware, to remove a specific field from a packaging format, and to restore a new firmware file to an original format type of the firmware. Then, the main processor, according to the received firmware upgrading task, stably transfer the new firmware to the coprocessor by means of the second interrupt signal and the shared memory. In a case that the coprocessor takes over the bus control right, the coprocessor uses the bus to write the new firmware into the server hardware component to overwrite the old firmware, which achieves the coprocessor-based firmware upgrading task, increases the utilization of the coprocessor, and improves the overall performance of the BMC.

Figure 4:
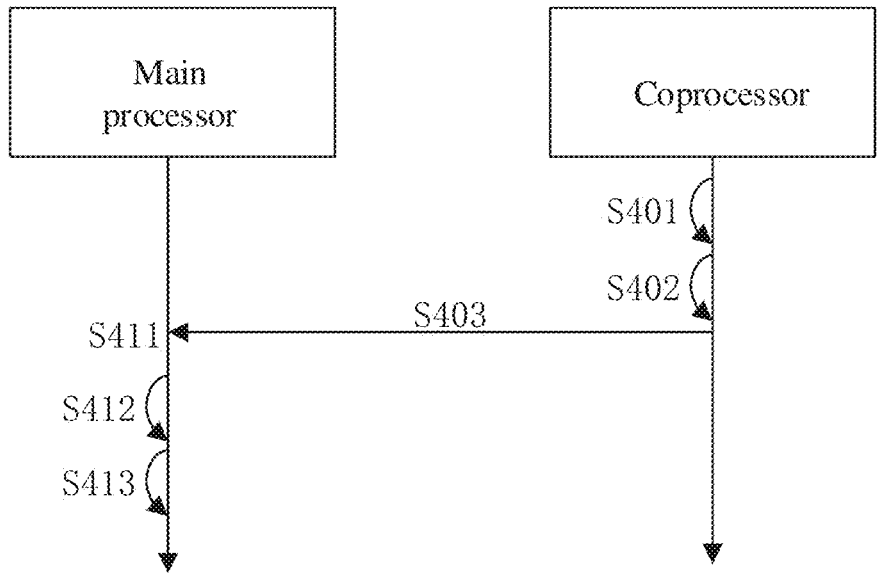
FIG. 4 is a fourth interaction schematic flowchart of a firmware upgrading method according to one or more embodiments of the present application.

In some optional implementations, as shown in FIG. 4, prior to step S113, the method provided in the embodiment of the present application further includes steps S401-S403 and steps S411-S413, wherein steps S401-S403 are applied to the coprocessor, and steps S411-S413 are applied to the main processor, in some embodiments as follows:

step S401, reading old firmware information from a to-be-upgraded server hardware component by means of the bus;

step S402, writing the old firmware information into the shared memory by means of the preset inter-core communication driver function; and step S403, sending a third interrupt signal to the main processor.

step S411, receiving the third interrupt signal sent by the coprocessor;

step S412, in response to the third interrupt signal, reading the old firmware information from the shared memory by means of the inter-core communication driver function; and step S413, storing the old firmware information in a database associated with the main processor system.

In some embodiments, in the embodiment, after the coprocessor takes over the bus control right for accessing the server hardware component, the coprocessor further reads the installed old firmware information from the to-be-upgraded server hardware component, and transfers the old firmware information to the main processor also by means of the interrupt signals and shared memory. The main processor stores the received old firmware information in the database associated with the main processor system. For example, Cortex A7 uses the linux system which mounts redis database whereby the old firmware information, including, but not limited to, a firmware version number, a firmware name, and a firmware size, is stored in the redis database. In this way, a historical firmware version and an upgrade record of the server hardware component might be archived, which are convenient for the user to flexibly retrieve in later problem traceability. In addition, it might also verify whether upgrade is successful based on the old firmware information stored in the redis database after update, which further improves the reliability of firmware upgrade.

Figure 5:
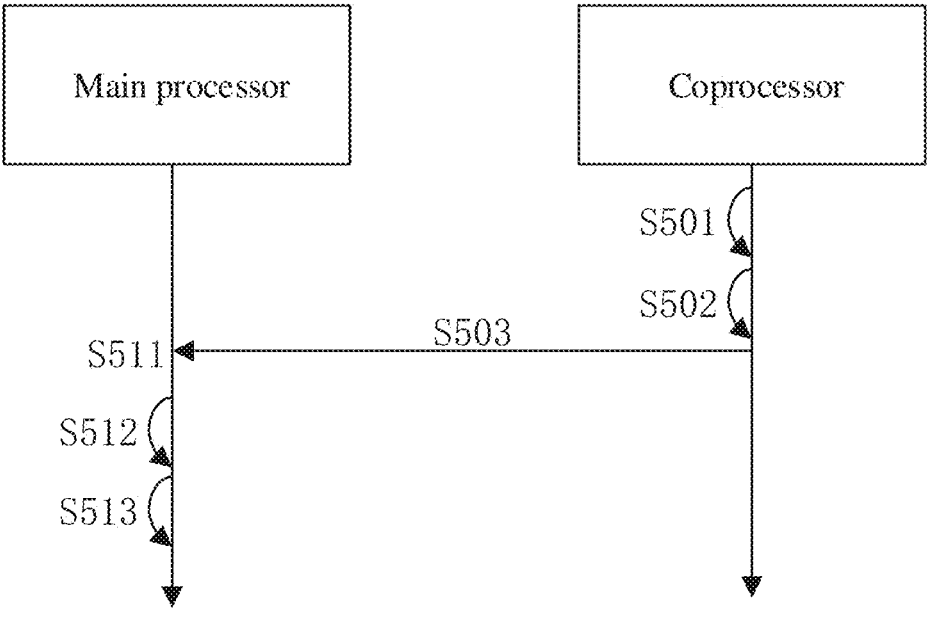
FIG. 5 is a fifth interaction schematic flowchart of a firmware upgrading method according to one or more embodiments of the present application.

In some optional implementations, as shown in FIG. 5, a firmware upgrading method provided by the present application further includes steps S501-S503 and steps S511-S513, wherein steps S501-S503 are applied to the coprocessor; and steps S511-S513 are applied to the main processor, in some embodiments as follows:

step S501, after firmware upgrade of the server hardware component, reading current firmware information from the server hardware component by means of the bus;

step S502, writing an upgrade end message and the current firmware information into the shared memory by means of the inter-core communication driver function; and step S503, sending a fourth interrupt signal to the main processor.

step S511, receiving the fourth interrupt signal sent by the coprocessor;

step S512, in response to the fourth interrupt signal, reading the upgrade end message and the current firmware information from the shared memory by means of the preset inter-core communication driver function; and step S513, in response to the upgrade end message, comparing the current firmware information with the old firmware information stored in the database, and judging whether upgrade is successful according to a comparison result at the same time.

In some embodiments, the embodiment is based on the old firmware information stored in the database of the main processor system. Once new firmware is upgraded, the coprocessor also reads the current firmware information of the upgraded server hardware component, to send the current firmware information to the main processor, which enables the main processor to compare the current firmware information with the un-upgraded old firmware information in the database. Therefore, whether upgrade is successful might be judged according to a comparison result. If the two pieces of firmware information are inconsistent after comparison, it indicates that the firmware of the server hardware component is successfully upgraded. If the two pieces of firmware information are consistent after comparison, it indicates failed upgrade, and there is a need for re-upgrade. Therefore, the stability and the reliability of firmware upgrade are further improved.

In some optional implementations, a firmware upgrading method provided by the present application further includes the following steps:

step b1, receiving an update history viewing request sent by the client by means of the front-end interface; and step b2, in response to the update history viewing request, displaying historical firmware information stored in the database in the front-end interface in a chronological order whereby the client views the historical firmware information by accessing the front-end interface.

In some embodiments, the embodiment of the present application might also display the historical firmware information stored in the database in the front-end interface in the chronological order according to the update history viewing request of the client, to enable the user to view the historical firmware information by accessing the front-end interface by means of the computer device, which achieves an effect of remotely troubleshooting problems anytime and anywhere, and solves the problem of untimely remote problem troubleshooting.

Figure 6:
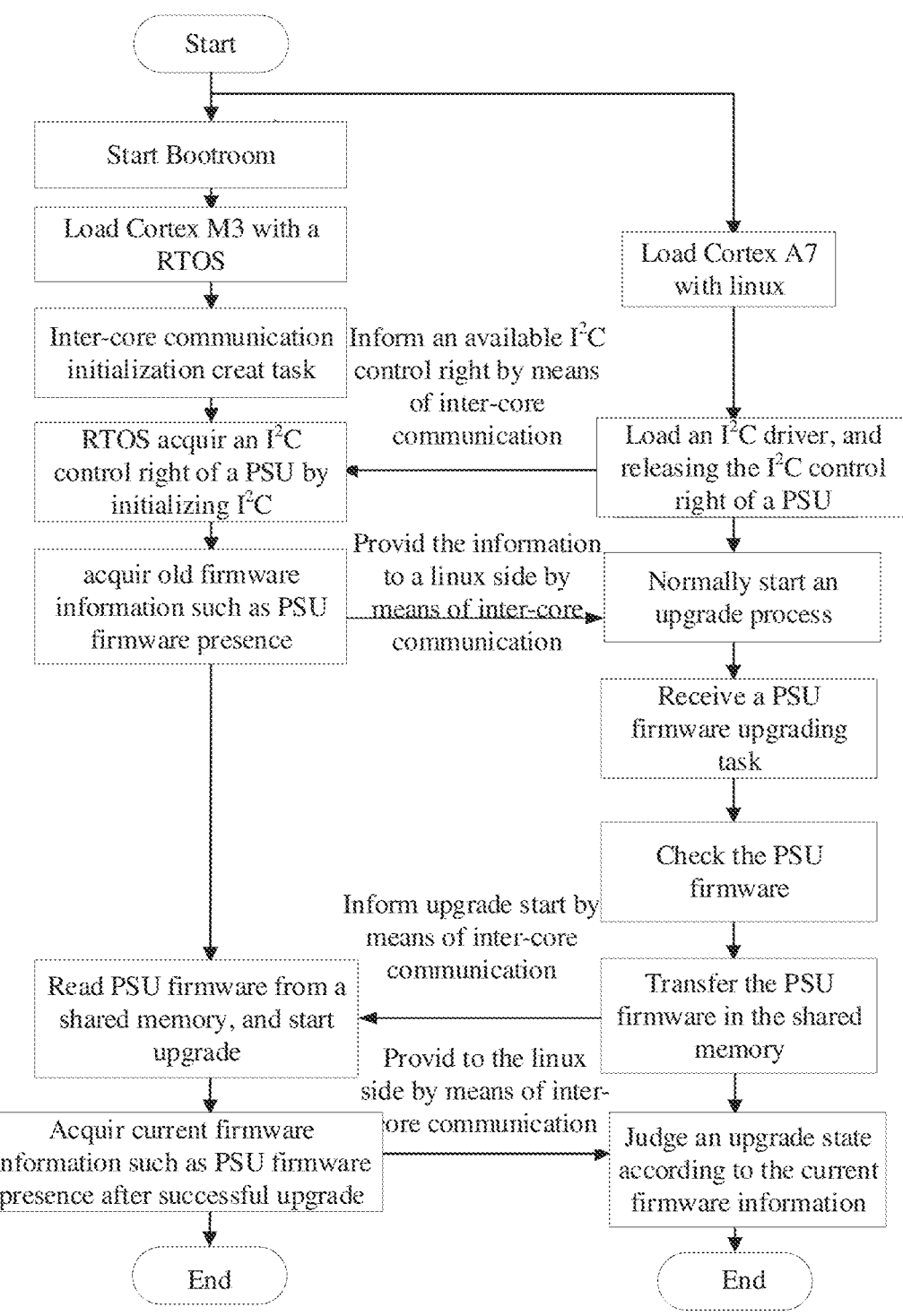
FIG. 6 is a sixth interaction schematic flowchart of a firmware upgrading method according to one or more embodiments of the present application.

For ease of understanding the solution of the present application, as shown in FIG. 6, in one or more embodiments, the server hardware component requiring firmware upgrade is a power supply unit (PSU); the BMC uses AST2600; and then the specific steps of the technical solution provided by the present application are as follows:

1) powering on the BMC, and loading Cortex A7 with bootrom to load the linux system; loading Cortex M3 with the RTOS at the same time; first starting the RTOS; and after startup, Cortex M3 initializing inter-core communication and creating a related task;

2) after loading the linux system, starting to load an I²C bus driver; and in this process, a linux side requiring to release a control right of an I²C bus where PSU is located, and calling the inter-core communication driver function to inform the RTOS side that an I²C driver might be loaded;

3) after the RTOS side receiving the message, acquiring the I²C bus control right of the PSU by initializing the I²C bus where the PSU is located (enabling the I²C bus of the PSU and configuring an I²C-related register of the PSU);

4) the RTOS side calling the I²C driver function to read old firmware information of the PSU, and fitting the old firmware information into the shared memory; the linux side reading the old firmware information of the PSU from the shared memory and storing the old firmware information in the redis database; and if the linux side requiring PSU related information, the linux side reading the information from the redis database;

5) the linux side receiving a PSU upgrading task by means of the front-end interface of the BMC to obtain new firmware; after the linux side checking the firmware prior to PSU upgrade, the linux side transferring the new firmware to the shared memory, and informing the RTOS side to start the PSU upgrading task;

6) the RTOS side reading the new firmware from the shared memory, and calling the I²C driver function to operate a PSU device for firmware upgrade;

7) after the success of the PSU upgrading task, the RTOS side calling the inter-core communication driver function to inform the linux side that the task is completed, calling the I²C driver function to read current firmware information such as a current PSU version and presence at the same time, and fitting the current firmware information into the shared memory; and 8) after the linux side acquiring a successful upgrade state, the linux side reading the current firmware information from the shared memory, fitting it into the redis database, reading the old firmware information in the redis database for content inspection at the same time, and analyzing whether the new firmware information is different from the old firmware information; and if the two pieces of firmware information are different, judging that PSU upgrade is successful.

The embodiment further provides a firmware upgrading apparatus, configured for achieving the above embodiments and in some embodiments implementations, and those described will not be repeated herein. As used below, the term "module" represents a combination of software and/or hardware that might be configured to implement prescribed functions. While the devices described in the following embodiments are preferably implemented in software, implementations in software and hardware or hardware are also possible and contemplated.

Figure 7:
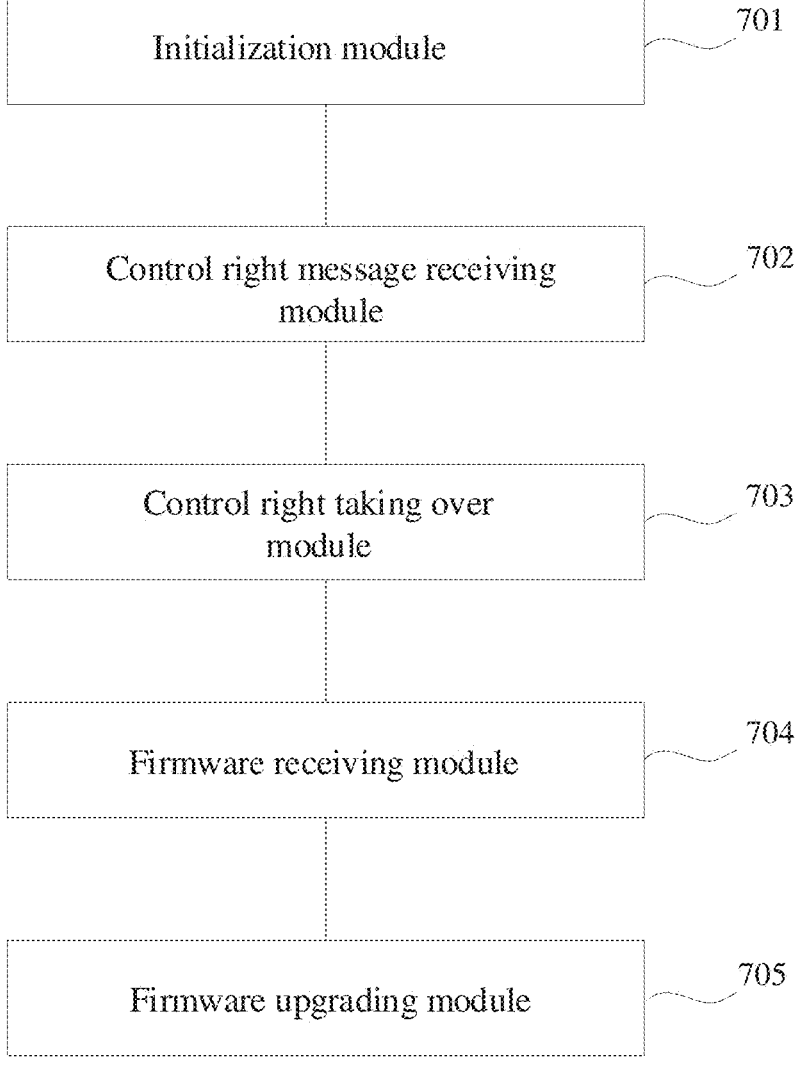
FIG. 7 is a schematic structural diagram of a firmware upgrading apparatus according to one or more embodiments of the present application.

The embodiment provides a firmware upgrading apparatus, as shown in FIG. 7, applied to a coprocessor, and including:

an initialization module 701, configured for powering on the coprocessor, loading same with a coprocessor system, and establishing inter-core communication with a main processor;

a control right message receiving module 702, configured for receiving a bus control right release message sent by the main processor, the bus control right release message being a notification message sent by the main processor to release a bus control right by means of loading a bus driver after powering on the main processor and loading same with the main processor system;

a control right taking over module 703, configured for, in response to the bus control right release message, taking over a bus control right;

a firmware receiving module 704, configured for receiving new firmware and a firmware upgrading message sent by the main processor; and a firmware upgrading module 705, configured for, in response to the firmware upgrading message, writing the new firmware into a corresponding server hardware component by means of a bus, so as to upgrade firmware of the server hardware component.

Figure 8:
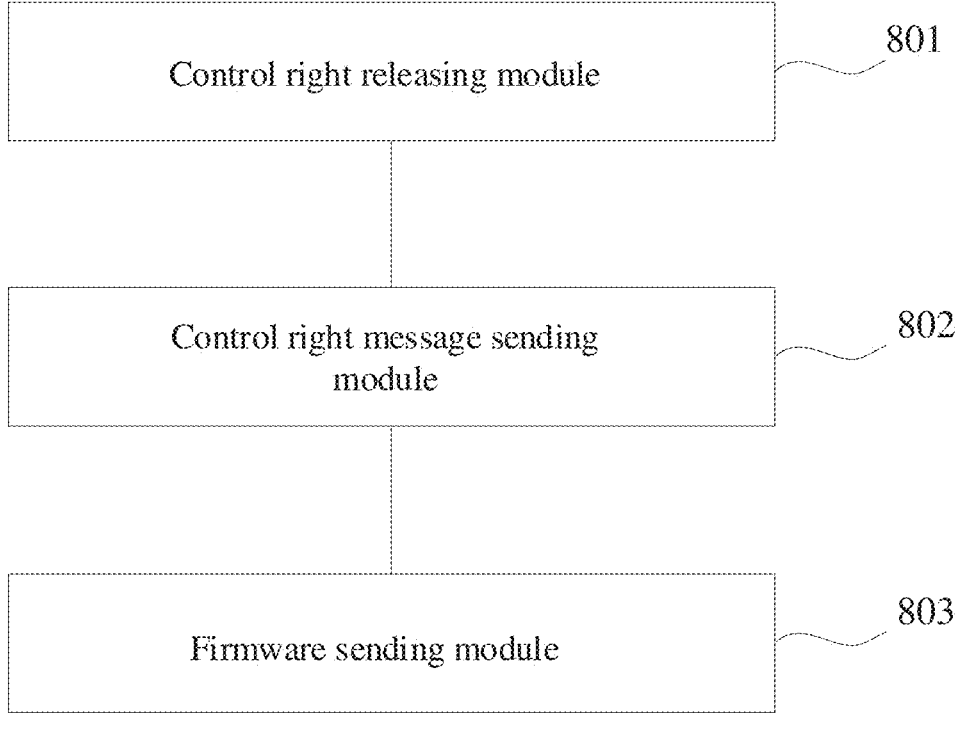
FIG. 8 is a schematic structural diagram of a firmware upgrading apparatus according to yet another or more embodiments of the present application.

The embodiment provides a firmware upgrading apparatus, as shown in FIG. 8, applied to a main processor, and including:

a control right releasing module 801, configured for powering on the main processor, loading same with a main processor system, and the main processor releasing a bus control right by means of loading a bus driver;

a control right message sending module 802, configured for, after powering on a coprocessor, loading same with a coprocessor system, and establishing inter-core communication with the main processor, sending a bus control right release message to the coprocessor whereby the coprocessor, in response to the bus control right release message, takes over the bus control right; and a firmware sending module 803, configured for sending new firmware and a firmware upgrading message to the coprocessor whereby the coprocessor, in response to the firmware upgrading message, writes the new firmware into a corresponding server hardware component by means of a bus, so as to upgrade firmware of the server hardware component.

Further functional descriptions of the above modules and units are the same as the above corresponding method embodiments, which will not be repeated herein.

A firmware upgrading apparatus in the embodiment presents in a form of a functional unit, the unit herein refers to an application specific integrated circuit (ASIC), a processor and a memory executing one or more software or fixed programs, and/or other devices that might provide the above functions.

The embodiment of the present application further provides a BMC, having the firmware upgrading apparatus shown in FIG. 7 or FIG. 8.

Figure 9:
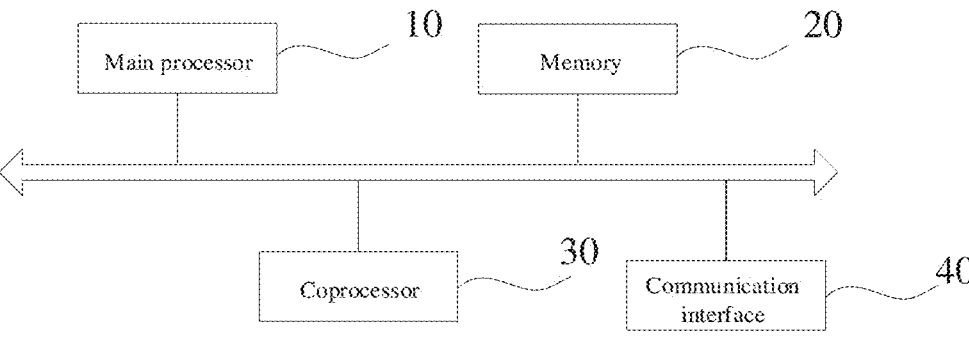
FIG. 9 is a schematic structural diagram of hardware of a BMC according to one or more embodiments of the present application.

Referring to FIG. 9, FIG. 9 is schematic structural diagram of a BMC 60 provided by an optional embodiment of the present application. As shown in FIG. 9, the BMC 60 includes: one or more main processors 10, one or more coprocessors 30, a memory 20 and interfaces configured for connecting various components, wherein the interfaces include a high-speed interface and a low-speed interface. Various components are communicatively connected with each other using different buses, and might be installed on a common motherboard or installed in other ways as needed. The processors might process instructions, including instructions stored in or on the memory to display graphical information of a Graphical User Interface (GUI) on an external input/output apparatus (such as a display device coupled to the interface), executed in a computer device. In some optional implementations, if desired, a plurality of processors and/or a plurality of buses might be used, as appropriate, along with a plurality of memories. Similarly, a plurality of computer devices may be connected, with each device providing portions of necessary operations (e.g., as a server array, a group of blade servers, or a multi-processor system). In FIG. 9, one main processor 10 and one coprocessor 30 are taken as an example.

The main processor 10 may be a central processing unit, a network processor or a combination thereof. The main processor 10 may further includes a hardware. The hardware may be an application-specific integrated circuit, a programmable logic device or a combination thereof. The programmable logic device may be a complex programmable logic device, a field-programmable gate array, a generic array logic or any combination thereof.

The coprocessor 30 may be a central processing unit, a network processor or a combination thereof. The coprocessor 30 may further includes a hardware. The hardware may be an application-specific integrated circuit, a programmable logic device or a combination thereof. The programmable logic device may be a complex programmable logic device, a field-programmable gate array, a generic array logic or any combination thereof.

The memory 20 stores instructions that might be executed by at least one main processor 10 and coprocessor 30 whereby the at least one main processor 10 and coprocessor 30 execute the method for implementing the above embodiment.

The memory 20 may include a program storage area and a data storage area, wherein the program storage area may store an operating system and an application program required by at least one function; and the data storage area may store, e.g., data created based on use of the computer device. In addition, the memory 20 may include a high speed random access memory, and may further include a non-transient memory such as at least one disk memory device, a flash memory device or other non-transient solid stage storage devices. In some optional implementations, the memory 20 in some embodiments includes memories configured remotely relative to the processor 10, and these remote memories may be connected to the computer device via a network. Examples of such networks may include, but are not limited to, Internet, intranet, a local area network, a mobile communication network, and combinations thereof.

The memory 20 may include a volatile memory, such as a random-access memory; the memory 20 may further include a non-transitory memory, such as a flash memory, a hard disk a solid-state drive hard disk; and the memory 20 may further include a combination of the above memories.

The computer device further includes a communication interface 40 for communicating with other devices or communication networks.

Figure 10:
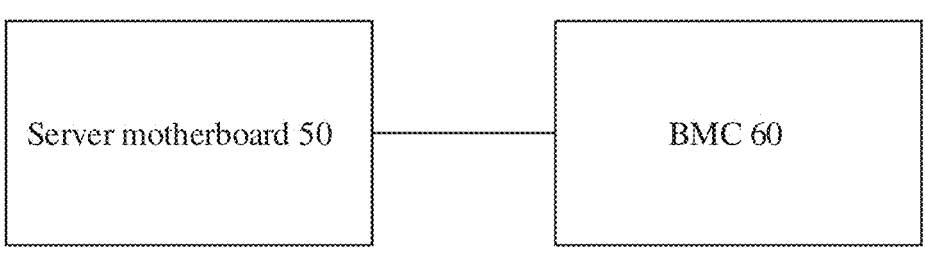
FIG. 10 is a schematic structural diagram of hardware of a server according to one or more embodiments of the present application.

Referring to FIG. 10, it shows a server provided by the optional embodiment of the present application. The server includes a server motherboard 50 and a BMC 60. The BMC 60 is communicatively connected with each hardware component on the server motherboard, and provides basic hardware management functions (such as monitoring a temperature, a fan rotating speed, a power supply state, etc. of the server motherboard 50) for the server motherboard 50. The BMC further provides a remote management function to enable an administrator to remotely manage the server via the network, including power control, reboot, BIOS configuration, etc. of the server motherboard 50. The BMC 60 is closely integrated with some hardware components (such as sensors) on the server motherboard, might sense state changes of the hardware in time and might report the state changes to the administrator. In addition, the BMC 60 also usually has its own IP address and network interface, which might be managed and monitored independently of the server operating system via the network. In short, the BMC 60 is an important part of server management, and might provide rich hardware management and remote management functions to help the administrator more efficiently manage the server.

Referring to FIG. 13, the embodiment of the present application further provides a non-transitory computer readable storage medium 1301. The above method according to the embodiment of the present application might be implemented in hardware and firmware, or might be implemented as being recordable in a storage medium, or might be implemented as a computer readable instruction 1302 downloaded over a network originally stored in a remote storage medium or a non-temporary machine readable storage medium and to be stored in a local storage medium. Therefore, the method described here might be processed via such software that is stored on the storage medium using a general purpose computer, or a special processor or programmable or dedicated hardware. The storage medium might be a magnetic disk, an optical disk, a read-only memory, a random access memory, a flash memory, hard disk or solid state hard disk. Further, the storage medium might also include a combination of the above types of memories. It is to be understood that the computer, the processor, a microprocessor controller or programmable hardware includes memory components that may store or receive software or computer readable instructions that, when accessed and executed by the computer, the processor or the hardware, implement the method shown in the above embodiments.

While the embodiments of the present application are described in combination with the accompanying drawings, those skilled in the art might make various modifications and variants without departing from the spirit and scope of the present application, and such modifications and variants fall within the scope defined by the appended claims.

What is claimed is:

1. A firmware upgrading method, being applied to a coprocessor, and comprising:

powering on the coprocessor, loading the coprocessor into a coprocessor system, and establishing inter-core communication with a main processor, wherein the coprocessor establishes the inter-core communication with the main processor by means of initialization comprising: configuring a shared memory and an interrupt signal format, wherein the shared memory is configured for the main processor and the coprocessor reading and writing data together, and the interrupt signal format is configured for the main processor and the coprocessor sending interrupt signals of a corresponding format to each other to read the data from the shared memory; and setting an interrupt enable to start an interrupt;

receiving, by the coprocessor, a bus control right release message sent by the main processor via the inter-core communication, the bus control right release message being a notification message stored in the shared memory and sent by the main processor to release a bus control right by means of loading a bus driver after powering on the main processor and loading the main processor into a main processor system;

in response to the bus control right release message, taking over the bus control right by the coprocessor;

receiving, by the coprocessor, new firmware and a firmware upgrading message stored in the shared memory and sent by the main processor via the inter-core communication; and in response to the firmware upgrading message, writing, by the coprocessor, the new firmware into a corresponding server hardware component by means of a bus, so as to upgrade old firmware of the server hardware component.

2. The method according to claim 1, wherein receiving the bus control right release message sent by the main processor comprises: receiving a first interrupt signal sent by the main processor, wherein the first interrupt signal is an interrupt signal sent by the main processor after the main processor stores the bus control right release message in the shared memory by means of a preset inter-core communication driver function; and in response to the first interrupt signal, reading the bus control right release message from the shared memory by means of the preset inter-core communication driver function.

3. The method according to claim 1, wherein receiving the new firmware and the firmware upgrading message sent by the main processor comprises: receiving a second interrupt signal sent by the main processor, wherein the second interrupt signal is an interrupt signal sent by the main processor after the main processor stores the new firmware and the firmware upgrading message in the shared memory by means of a preset inter-core communication driver function; and in response to the second interrupt signal, reading the new firmware and the firmware upgrading message from the shared memory by means of the preset inter-core communication driver function.

4. The method according to claim 1, wherein before receiving the new firmware and the firmware upgrading message sent by the main processor, the method further comprises:

reading old firmware information of the old firmware from the server hardware component by means of the bus;

writing the old firmware information into the shared memory by means of a preset inter-core communication driver function; and sending a third interrupt signal to the main processor whereby the main processor, in response to the third interrupt signal, reads the old firmware information from the shared memory by means of the preset inter-core communication driver function and stores the old firmware information in a database associated with the main processor system.

5. The method according to claim 4, further comprising:

after the upgrade of the server hardware component, reading current firmware information from the server hardware component by means of the bus;

writing an upgrade end message and the current firmware information into the shared memory by means of the preset inter-core communication driver function; and sending a fourth interrupt signal to the main processor whereby the main processor reads the upgrade end message and the current firmware information from the shared memory by means of the preset inter-core communication driver function in response to the fourth interrupt signal, compares the current firmware information with the old firmware information stored in the database in response to the upgrade end message, and judges whether the upgrade was successful according to a comparison result at the same time.

6. The method according to claim 1, wherein the coprocessor system is a real-time operating system.

7. The method according to claim 1, wherein the bus is an inter-integrated circuit ($I^2C$) bus; and the coprocessor taking over the bus control right comprises:

enabling the $I^2C$ bus of the server hardware component by means of configuring a system control unit register; and acquiring an $I^2C$ bus control right of the server hardware component by configuring an $I^2C$ related register of the server hardware component.

8. A baseboard management controller (BMC), comprising a coprocessor, a main processor and a memory, wherein the memory is communicatively connected with the coprocessor and the main processor respectively, and stores computer instructions therein that, when executed by the coprocessor, cause the coprocessor to perform the method according to claim 1.

9. A server, comprising a server motherboard and a baseboard management controller (BMC), wherein the BMC is communicatively connected with each hardware component on the server motherboard, and stores computer instructions therein that, when executed by the BMC, cause the BMC to perform the method according to claim 1.

10. A non-transitory computer readable storage medium, storing computer instructions therein, wherein when executed by a computer, the computer instructions cause the computer to perform the method according to claim 1.

11. The method according to claim 1, wherein the server hardware component comprises a power supply unit (PSU).

12. A firmware upgrading method, being applied to a main processor, and comprising:

powering on the main processor, loading the main processor into a main processor system, and the main processor releasing a bus control right by means of loading a bus driver;

after powering on a coprocessor, loading the coprocessor into a coprocessor system, and establishing inter-core communication between the coprocessor and the main processor, sending a bus control right release message to the coprocessor whereby the coprocessor, in response to the bus control right release message, takes over the bus control right; and sending new firmware and a firmware upgrading message to the coprocessor whereby the coprocessor, in response to the firmware upgrading message, writes the new firmware into a corresponding server hardware component by means of a bus, so as to upgrade old firmware of the server hardware component;

wherein the coprocessor establishing the inter-core communication with the main processor by means of initialization comprises: the coprocessor configuring a shared memory and an interrupt signal format, and setting an interrupt enable to initialize the inter-core communication with the main processor, wherein the shared memory is configured for the main processor and the coprocessor reading and writing data together; and the interrupt signal format is configured for the main processor and the coprocessor sending interrupt signals of a corresponding format to each other to read the data from the shared memory; and sending the bus control right release message to the coprocessor comprises:

storing the bus control right release message in the shared memory by means of a preset inter-core communication driver function; and sending a first interrupt signal to the coprocessor whereby the coprocessor, in response to the first interrupt signal, reads the bus control right release message from the shared memory by means of the preset inter-core communication driver function.

13. The method according to claim 12, wherein a front-end interface is deployed in the main processor system, and is configured for a client remotely accessing the main processor system; and sending the new firmware and the firmware upgrading message to the coprocessor comprises:

receiving the new firmware uploaded by the client by means of the front-end interface;

checking the new firmware;

storing the firmware upgrading message and the new firmware after being checked in the shared memory by means of the preset inter-core communication driver function; and sending a second interrupt signal to the coprocessor whereby the coprocessor, in response to the second interrupt signal, reads the new firmware and the firmware upgrading message from the shared memory by means of the preset inter-core communication driver function.

14. The method according to claim 12, wherein before sending the new firmware and the firmware upgrading message to the coprocessor, the method further comprises:

receiving a third interrupt signal sent by the coprocessor, wherein the third interrupt signal is an interrupt signal sent by the coprocessor reading old firmware information of the old firmware from the server hardware component by means of the bus and writing the old firmware information into the shared memory by means of the preset inter-core communication driver function;

in response to the third interrupt signal, reading the old firmware information from the shared memory by means of the preset inter-core communication driver function; and storing the old firmware information in a database associated with the main processor system.

15. The method according to claim 14, further comprising:

receiving a fourth interrupt signal sent by the coprocessor, wherein the fourth interrupt signal is another interrupt signal sent by the coprocessor, after the upgrade of the server hardware component, reading current firmware information from the server hardware component by means of the bus, and writing an upgrade end message and the current firmware information into the shared memory by means of the preset inter-core communication driver function;

in response to the fourth interrupt signal, reading the upgrade end message and the current firmware information from the shared memory by means of the preset inter-core communication driver function; and in response to the upgrade end message, comparing the current firmware information with the old firmware information stored in the database, and judging whether the upgrade was successful according to a comparison result at the same time.

16. The method according to claim 14, wherein a front-end interface is deployed in the main processor system, and is configured for a client remotely accessing the main processor system; and the method further comprises:

receiving an update history viewing request sent by the client by means of the front-end interface; and in response to the update history viewing request, displaying historical firmware information stored in the database in the front-end interface in a chronological order whereby the client views the historical firmware information by accessing the front-end interface.

17. A baseboard management controller (BMC), comprising a coprocessor, a main processor and a memory, wherein the memory is communicatively connected with the coprocessor and the main processor respectively, and stores computer instructions therein that, when executed by the main processor, cause the main processor to perform the method according to claim 12.

18. A server, comprising a server motherboard and a baseboard management controller (BMC), wherein the BMC is communicatively connected with each hardware component on the server motherboard, and stores computer instructions therein that, when executed by the BMC, cause the BMC to perform the method according to claim 12.

19. A non-transitory computer readable storage medium, storing computer instructions therein, wherein when executed by a computer, the computer instructions cause the computer to perform the method according to claim 12.

* * * * *